Dec. 6, 1966     E. M. TERRY     3,289,348
SOUNDING APPARATUS FOR BICYCLES
Filed Nov. 20, 1963
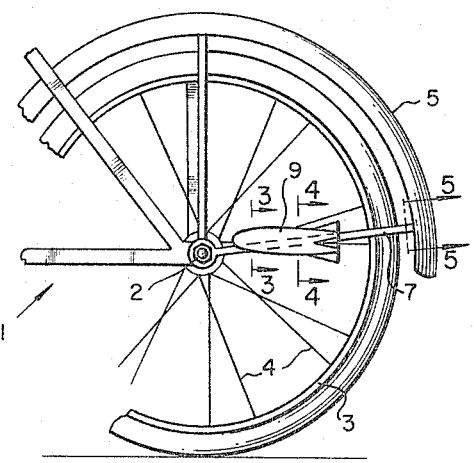
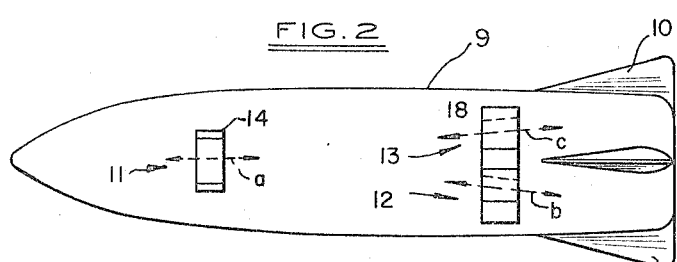
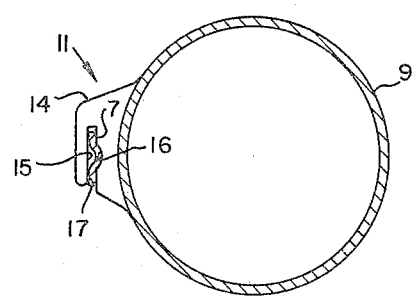
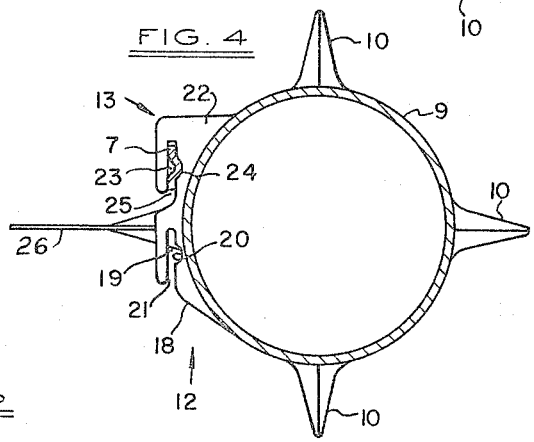
*INVENTOR*
EARL M. TERRY
BY
*Learman & McCulloch*
*ATTORNEYS*

United States Patent Office 3,289,348
Patented Dec. 6, 1966

3,289,348
SOUNDING APPARATUS FOR BICYCLES
Earl M. Terry, G–6044 E. Pierson Road, Flint, Mich.
Filed Nov. 20, 1963, Ser. No. 325,185
1 Claim. (Cl. 46—175)

This invention relates to sounding apparatus adapted to be attached to a bicycle or other spoke wheel vehicle so as to emit a sound in response to rotation of the wheel.

A principal object of the invention is to provide sounding apparatus of the character referred to which may be mounted on and demounted from a bicycle or the like without necessitating the use of tools of any kind or any attaching elements other than those with which the apparatus initially is equipped.

Another object of the invention is to provide sounding apparatus of the kind described and which may be mounted in a substantially horizontal plane regardless of whether the bicycle part on which the apparatus is to be mounted is horizontal or is inclined to the horizontal.

Other objects and advantages of the invention will be pointed out specifically or will become apparent from the following description when it is considered in conjunction with the appended claims and the accompanying drawings, in which:

FIGURE 1 is a fragmentary, elevational view illustrating a bicycle wheel provided with apparatus constructed in accordance with the invention;

FIGURE 2 is a side elevational view of the sounding apparatus, but rotated through 180°;

FIGURE 3 is a transverse sectional view taken on the line 3—3 of FIGURE 1;

FIGURE 4 is a transverse sectional view taken on the line 4—4 of FIGURE 1; and

FIGURE 5 is a transverse sectional view taken on the line 5—5 of FIGURE 1.

Apparatus constructed in accordance with the invention is adapted for use in conjunction with a bicycle having the usual tubular frame 1 on which is mounted an axle 2. Journaled on the axle 2 is a wheel 3 having a plurality of substantially radially extending wire spokes 4. A fender 5 may partially surround the wheel 3 and be secured to the frame by means including a brace 7 that is longitudinally deformed to provide a concavo-convex ribbed surface 8 for rigidity.

The apparatus thus far described is conventional and forms no part of the invention per se, aside from its cooperation with the parts yet to be described.

Apparatus constructed in accordance with the invention comprises a generally cylindrical body 9 formed of molded plastic or rubber and having the shape of a rocket. At the rear end of the body 9 may be secured three fin-like elements 10.

Adjacent one end of the body is an attaching member or clip 11 and adjacent the other end of the body is a pair of circumferentially spaced, similar attaching members or clips 12 and 13. The member 11 comprises a block 14 that is secured to the body 9 on substantially the longitudinal center line thereof and is provided with an opening 15 therein to accommodate the brace 7, the opening having a recess 16 of such size and shape as to complement the shape of the ribbed surface 8 and in which the latter may be accommodated so as to extend fore and aft of the body 9 along a line generally indicated by the arrow a. A slot 17 communicates with the opening 15 so as to enable the brace 7 to be introduced to and removed from the opening 15.

The attaching member 12 is similar to the member 11 and includes a block 18 having an opening 19 therein to accommodate the brace 7 along a line generally indicated by the arrow b, the opening 19 having a recess 20 complementary to the ribbed surface 8 so as to receive the latter. A slot 21 communicates with the opening 19 to enable the brace 7 to pass into and out of the opening.

The attaching clip 13 has a block 22 provided with an opening 23 to accommodate the brace 7 along the line generally indicated by the arrow c. In the opening 23 is a recess 24 and a slot 25 similar to the recess 20 and the slot 21, respectively.

The members 11 and 12 are secured to the body 9 along substantially the longitudinal center line of the body, but the circumferential spacing of the member 13 from the member 12 enables the member 13 to be located at a level which is vertically spaced from the member 12 when the body is arranged with its longitudinal axis horizontal. The significance of the spacing of the members 12 and 13 will be explained hereinafter.

Secured to the body 9 between the members 12 and 13 is a reed or fin 26 which projects laterally from the body 9 a distance sufficient to enable it to protrude between adjacent wheel spokes 4 so as to be engaged by successive spokes and make a sound in response to rotation of the wheel.

The construction and arrangement of the mounting members 11, 12 and 13 are such that the body 9 may be mounted on the brace 7 merely by inserting the brace 7 in the opening 15 of the member 11 and in one of the openings 19 or 23 of the members 12 and 13. The reception of the ribbed surface 8 in the corresponding recesses will maintain the body 9 on the brace 7 with the fin 26 in a position to be engaged by successive spokes 4 so as to produce a noise in response to rotation of the wheel 3. The sounding apparatus may be removed from the brace 7 by applying sufficient force to the body 9 to enable removal of the brace from the respective openings 15 and 19.

On some bicycles the brace 7 is horizontal, and the apparatus may be mounted on such a brace by utilization of the mounting members 11 and 12. On other bicycles, however, the fender brace is inclined upwardly to the horizontal in the rearward direction from the axle 2. To mount the body 9 on such an inclined brace, the members 11 and 13 may be utilized, in which event the body 9 will be supported in a substantially horizontal position.

The disclosed embodiment is representative of a presently preferred form of the invention, but is intended to be illustrative rather than definitive thereof. The invention is defined in the claim.

What is claimed is:

Sounding apparatus for use with a spoke wheel vehicle having a ribbed fender brace adjacent said wheel, said apparatus comprising a body member; first attaching means on said body member adjacent one end thereof, said first attaching means comprising a clip member having an opening therein shaped to complement the ribbed surface of said brace, said opening being in communication with a slot through which said brace may pass for removable accommodation in said opening; second attaching means on said body member adjacent the other end thereof, said second attaching means comprising two of said clip members arranged in vertically spaced relation, each of said two clip members having an opening therein shaped to complement the ribbed surface of said brace, and each of such openings being in communication with a slot through which said brace may pass for removable accommodation in said opening, whereby said body may be supported on said brace by said first attaching means and by either of said two clip members in a substantially horizontal position regardless of whether said brace is horizontal or is inclined to the horizontal; and a fin secured to said body member and projecting laterally therefrom a distance to be engaged by successive spokes of said wheel in response to rotation of the latter.

References Cited by the Examiner
UNITED STATES PATENTS

| | | | |
|---|---|---|---|
| 2,609,640 | 9/1952 | Newell et al. | 46—175 |
| 2,987,850 | 6/1961 | Bergland | 46—175 |

DELBERT B. LOWE, *Primary Examiner.*

R. F. CUTTING, *Assistant Examiner.*